US008847961B2

(12) United States Patent
Marison

(10) Patent No.: US 8,847,961 B2
(45) Date of Patent: Sep. 30, 2014

(54) GEOMETRY, SPEED, PRESSURE, AND ANTI-ALIASING FOR INK RENDERING

(75) Inventor: Scott R. Marison, Honolulu, HI (US)

(73) Assignee: Microsoft Corporation, Redmond, WA (US)

( * ) Notice: Subject to any disclaimer, the term of this patent is extended or adjusted under 35 U.S.C. 154(b) by 674 days.

(21) Appl. No.: 12/814,632

(22) Filed: Jun. 14, 2010

(65) Prior Publication Data

US 2011/0304643 A1 Dec. 15, 2011

(51) Int. Cl.
*G06T 11/20* (2006.01)
*G06T 11/40* (2006.01)
*G06T 11/00* (2006.01)
*G06T 11/60* (2006.01)

(52) U.S. Cl.
CPC .............. *G06T 11/203* (2013.01); *G06T 11/40* (2013.01); *G06T 11/206* (2013.01); *G06T 11/001* (2013.01); *G06T 11/60* (2013.01)
USPC ........... 345/441; 345/689; 345/691; 345/692; 345/440; 345/440.1; 345/440.2; 345/442; 345/443; 345/168; 345/173; 345/611

(58) Field of Classification Search
CPC ...... G06T 11/203; G06T 11/40; G06T 11/206
USPC ................... 345/589–592, 440–442
See application file for complete search history.

(56) References Cited

U.S. PATENT DOCUMENTS

| 6,373,490 B1 * | 4/2002 | Bendiksen et al. ........... 345/441 |
|---|---|---|
| 7,120,872 B2 | 10/2006 | Thacker |
| 7,154,511 B2 | 12/2006 | Bernstein |
| 7,352,366 B2 * | 4/2008 | Dresevic et al. ............. 345/179 |
| 7,499,058 B2 | 3/2009 | Van Ness et al. |
| 7,602,405 B2 * | 10/2009 | Hsu .............................. 345/629 |
| 7,663,638 B2 | 2/2010 | Sander et al. |
| 7,714,866 B2 | 5/2010 | Sander |
| 7,924,284 B2 * | 4/2011 | Ewanchuk et al. ........... 345/443 |
| 8,018,400 B2 * | 9/2011 | Kim et al. ....................... 345/60 |
| 2004/0233196 A1 * | 11/2004 | Hertzmann .................. 345/441 |
| 2005/0078097 A1 | 4/2005 | Dresevic et al. |
| 2005/0093841 A1 | 5/2005 | Dodge et al. |
| 2006/0001656 A1 | 1/2006 | LaViola et al. |
| 2006/0170683 A1 * | 8/2006 | Lin .............................. 345/467 |
| 2006/0232597 A1 * | 10/2006 | Davignon et al. ............. 345/581 |
| 2007/0216684 A1 * | 9/2007 | Hsu .............................. 345/441 |
| 2007/0268304 A1 * | 11/2007 | Hsu .............................. 345/592 |
| 2009/0033673 A1 * | 2/2009 | Siegel et al. .................. 345/582 |
| 2009/0231338 A1 | 9/2009 | Carr et al. |

OTHER PUBLICATIONS

"International Search Report", Mailed Date: Feb. 9, 2012, Application No. PCT/US2011/038579, Filed Date: May 31, 2011, pp. 10.

(Continued)

*Primary Examiner* — Jin-Cheng Wang
(74) *Attorney, Agent, or Firm* — Micah Goldsmith; Glen Johnson; Micky Minhas

(57) ABSTRACT

Ink rendering techniques are described. In an implementation, an input is recognized by one or more modules that are executable on one or more processors of a computing device as an ink stroke to be rendered by a display device of the computing device. The ink stroke is built by the one or more modules using a strip of triangles and the strip of triangles is sent to a graphics processing unit to render the ink stroke.

19 Claims, 12 Drawing Sheets

(56) References Cited

OTHER PUBLICATIONS

Chen, Hung-Li J., et al., "GPU-based Point Radiation for Interactive Volume Sculpting and Segmentation", *The Visual Computer: International Journal of Computer Graphics*, vol. 24, Issue 7, Available at <http://pages.cpsc.ucalgary.ca/~samavati/papers/CGI08Printed.pdf>, (Jul. 2008), pp. 1-9.

Hertzmann, Aaron "Algorithms for Rendering in Artistic Styles", *Dissertation, Department of Computer Science, New York University*, Available at <http://mrl.nyu.edu/publications/hertzmann-thesis/hertzmann-thesis-72dpi.pdf>,(May 2001), 173 pages.

Willis, Nathan "Unleash your inner Old Master with Mypaint", Retrieved from: <http://blog.worldlabel.com/2010/unleash-your-inner-old-master-with-mypaint-open-source.html>on Jan. 7, 2011, (2010), 12 pages.

\* cited by examiner

GEOMETRY, SPEED, PRESSURE, AND ANTI-ALIASING FOR INK RENDERING

BACKGROUND

The way in which users are able to interact with computing device is ever increasing. For example, keyboards were originally provided so that a user could type inputs to a computer. Cursor control devices (e.g., a "mouse") were subsequently developed to enable users to interact with the computing device via a graphical user interface.

However, these and subsequent techniques that were developed for user interaction may still have an artificial "look and feel" to the user. For example, traditional techniques that were utilized to render ink strokes by a computing device may be rendered to look artificial. Additionally, traditional techniques that were developed to provide a more realistic look to the ink strokes may make the strokes unsuitable for other applications, such as ink analysis. Accordingly, traditional techniques often forced developers to decide between a realistic look having limited functionality or increased functionality but a relatively artificial appearance.

SUMMARY

Ink rendering techniques are described. In an implementation, an input is recognized by one or more modules that are executable on one or more processors of a computing device as an ink stroke to be rendered by a display device of the computing device. The ink stroke is built by the one or more modules using a strip of triangles and the strip of triangles is sent to a graphics processing unit to render the ink stroke.

In implementations, an input is recognized by one or more modules that are executable on one or more processors of a computing device as an ink stroke to be rendered by a display device of the computing device. A speed and a pressure are determined that correspond to a point in the ink stroke and a display characteristic is adjusted of the point in the ink stroke for rendering of the point based on the determined speed and pressure.

In implementations, an input is recognized by one or more module executable on one or more processors of a computing device as an ink stroke to be rendered by a display device of the computing device. Data of the input is encoded by encoding data describing a width of the ink stroke in pixels at a vertex, encoding data describing whether the vertex describes a left edge or a right edge of the ink stroke, and encoding data describing an anti-alias thickness in pixels to be applied to one or more said edges of the ink stroke at the vertex. The encoded data is passed to a graphics processing unit as part of a geometry of the ink stroke to compute an alpha value by the graphics processing unit to produce an anti-aliasing effect based on the encoded data.

In implementations, a mask stroke is drawn to a stencil buffer of a graphics processing unit to indicate which pixels are involved in the mask stroke. One or more ink strokes are drawn that logically correspond to the mask stroke by drawing pixels of the one or more inks strokes that do not correspond to the pixels that are involved in the mask stroke as indicated by the stencil buffer and not drawing pixels of the one or more ink strokes that do correspond to the pixels that are involved in the mask stroke as indicated by the stencil buffer.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different instances in the description and the figures may indicate similar or identical items.

DETAILED DESCRIPTION

Overview

Traditional techniques that were utilized to render ink strokes by a computing device may end up looking artificial. Additionally, techniques that were developed to provide a more realistic look to the ink strokes may make the strokes unsuitable for other applications, such as ink analysis. Accordingly, traditional techniques often forced developers to decide between a realistic look having limited functionality or increased functionality but a relatively artificial appearance.

Ink rendering techniques are described. In implementations, ink rendering techniques are provided that may produce realistic looking ink, but still allow for ink analysis to run based on geometric representation of the ink stroke, such as through vector rendering by building the ink stroke using a strip of triangles. These techniques may be used to emulate paper, pen, and drawing characteristics (e.g., pressure and speed) through the use of pixel shaders and textures, which may then be applied to ink strokes for rendering. In this way, realistic ink rendering effects may be utilized while still supporting ink analysis, e.g., for search and indexing. Further discussion of a variety of different ink rendering techniques may be found in relation to the following sections.

In the following discussion, an example environment is first described that is operable to employ the ink rendering techniques described herein. Example illustrations of the techniques and procedures are then described, which may be employed in the example environment as well as in other environments. Accordingly, the example environment is not limited to performing the example techniques and procedures. Likewise, the example techniques and procedures are not limited to implementation in the example environment.

Example Environment

Figure 1:
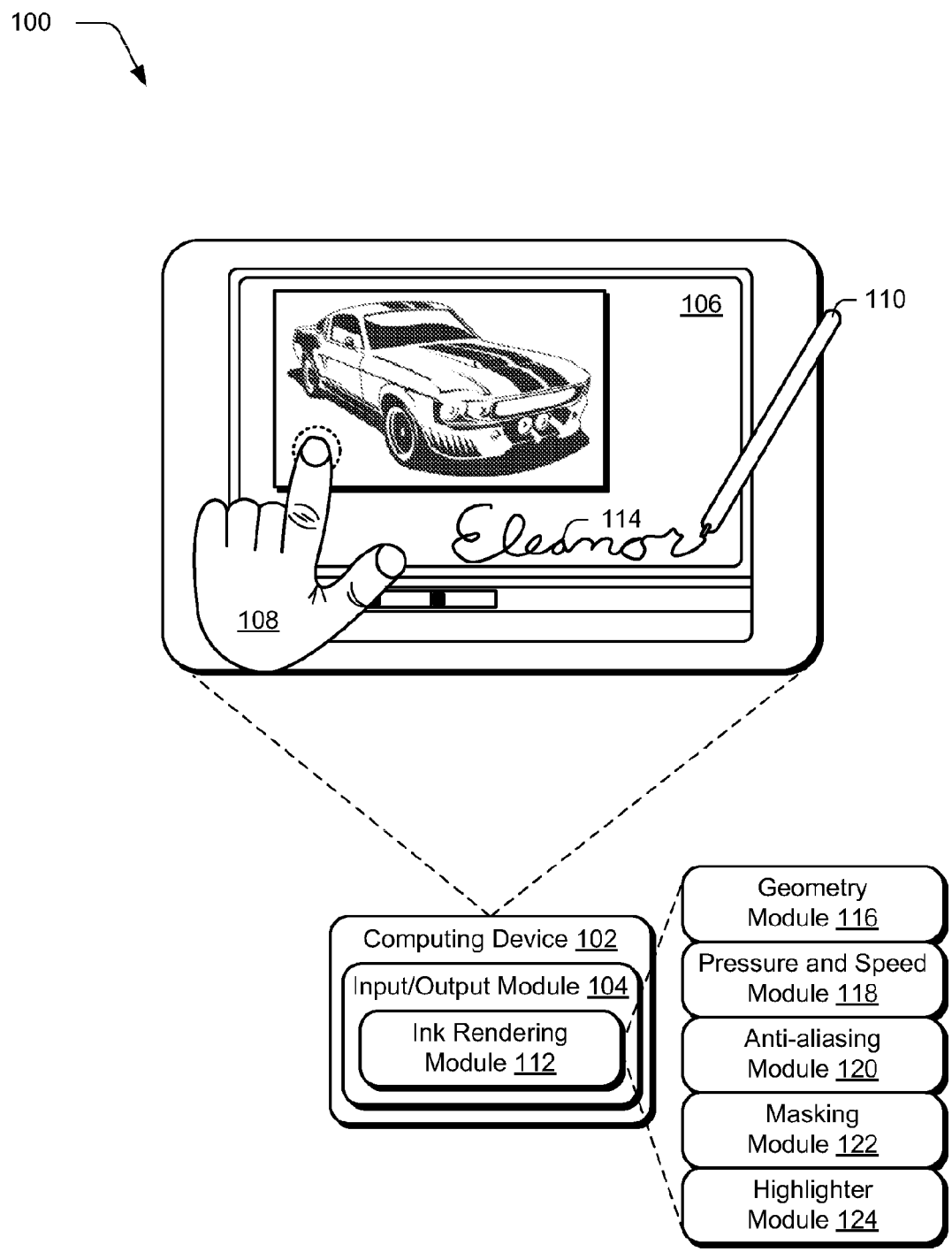
FIG. 1 is an illustration of an environment in an example implementation that is operable to employ ink rendering techniques described herein.

FIG. 1 is an illustration of an environment 100 in an example implementation that is operable to employ ink rendering techniques. The illustrated environment 100 includes an example of a computing device 102 that may be configured in a variety of ways. For example, the computing device 102 may be configured as a traditional computer (e.g., a desktop personal computer, laptop computer, and so on), a mobile station, an entertainment appliance, a set-top box communicatively coupled to a television, a wireless phone, a netbook, a game console, and so forth as further described in relation to FIG. 2. Thus, the computing device 102 may range from full resource devices with substantial memory and processor resources (e.g., personal computers, game consoles) to a low-resource device with limited memory and/or processing resources (e.g., traditional set-top boxes, hand-held game consoles). The computing device 102 may also relate to software that causes the computing device 102 to perform one or more operations.

The computing device 102 is illustrated as including an input/output module 104. The input/output module 104 is representative of functionality relating to inputs and outputs of the computing device 102. For example, the input/output module 104 may be configured to receive inputs from a keyboard, mouse, to identify gestures and cause operations to be performed that correspond to the gestures, and so on. The inputs may be identified by the input/output module 104 in a variety of different ways.

For example, the input/output module 104 may be configured to recognize an input received via touchscreen functionality of a display device 106, such as a finger of a user's hand 108 as proximal to the display device 106 of the computing device 102, from a stylus 110, and so on. The input may take a variety of different forms, such as to recognize movement of the stylus 110 and/or a finger of the user's hand 108 across the display device 106, such as a tap, drawing of a line, and so on. In implementations, these inputs may be recognized as gestures.

Although the following discussion may describe specific examples of inputs, in instances the types of inputs may be switched (e.g., touch may be used to replace stylus and vice versa) and even removed (e.g., both inputs may be provided using touch or a stylus) without departing from the spirit and scope thereof. Further, although in instances in the following discussion the gestures are illustrated as being input using touchscreen functionality, the gestures may be input using a variety of different techniques by a variety of different devices, such as through detection by a camera as part of a natural user interface (NUI).

The computing device 102 is further illustrated as including an ink rendering module 112 that is representative of functionality to apply a variety of different techniques to render an ink stroke 114, e.g., for display on the display device 106 of the computing device 102. Examples of these techniques are represented by a geometry module 116, a pressure and speed module 118, an anti-aliasing module 120, a masking module 122, and a highlighter module 124. Further discussion of each of these techniques may be found in a corresponding section in the implementations examples below the follows the example environment.

Figure 2:
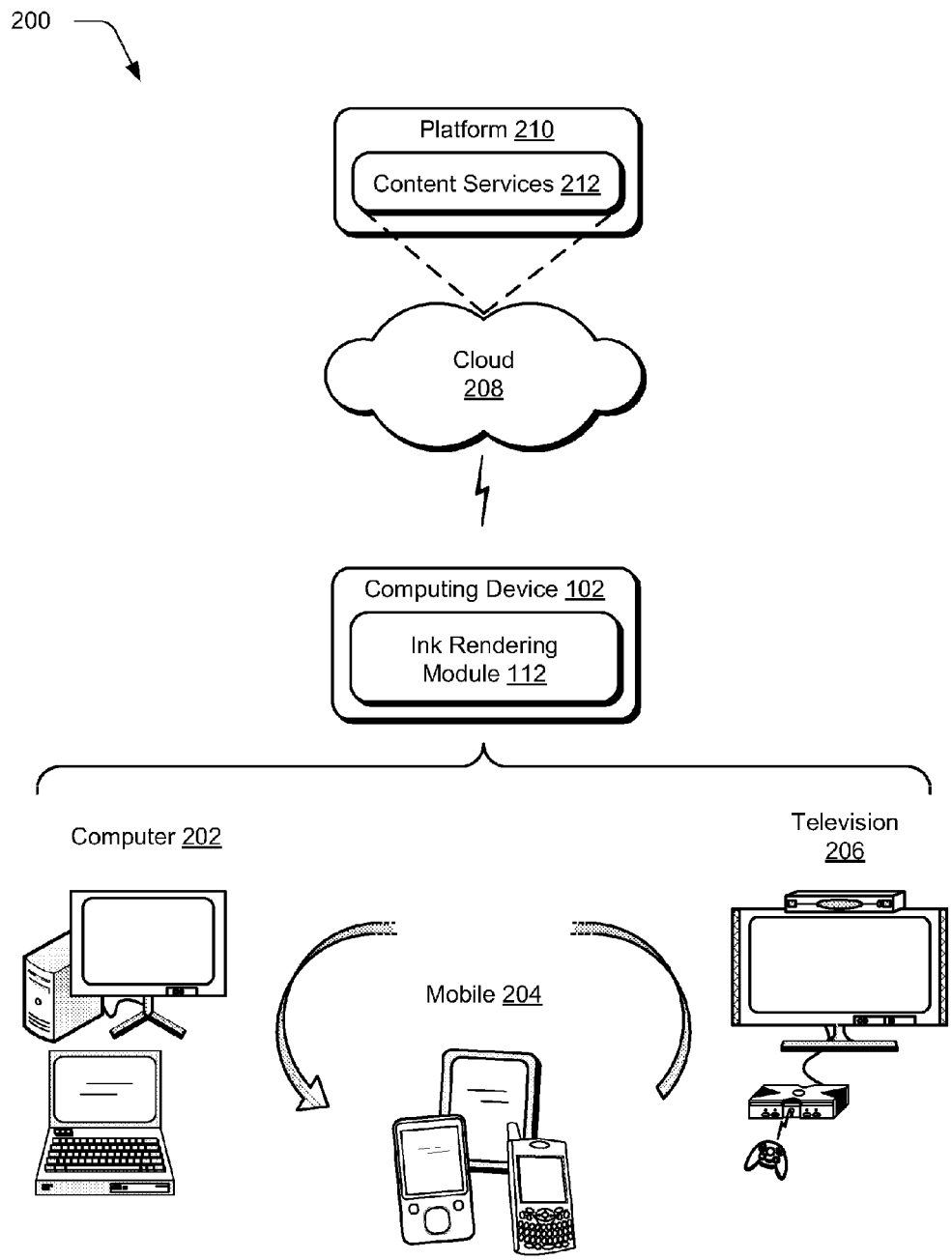
FIG. 2 is an illustration of an example system showing an ink rendering module of FIG. 1 as being implemented using in an environment where multiple devices are interconnected through a central computing device.

FIG. 2 illustrates an example system 200 that includes the computing device 102 as described with reference to FIG. 1. The example system 200 enables ubiquitous environments for a seamless user experience when running applications on a personal computer (PC), a television device, and/or a mobile device. Services and applications run substantially similar in all three environments for a common user experience when transitioning from one device to the next while utilizing an application, playing a video game, watching a video, and so on.

In the example system 200, multiple devices are interconnected through a central computing device. The central computing device may be local to the multiple devices or may be located remotely from the multiple devices. In one embodiment, the central computing device may be a cloud of one or more server computers that are connected to the multiple devices through a network, the Internet, or other data communication link. In one embodiment, this interconnection architecture enables functionality to be delivered across multiple devices to provide a common and seamless experience to a user of the multiple devices. Each of the multiple devices may have different physical requirements and capabilities, and the central computing device uses a platform to enable the delivery of an experience to the device that is both tailored to the device and yet common to all devices. In one embodiment, a class of target devices is created and experiences are tailored to the generic class of devices. A class of devices may be defined by physical features, types of usage, or other common characteristics of the devices.

In various implementations, the client device 102 may assume a variety of different configurations, such as for computer 202, mobile 204, and television 206 uses. Each of these configurations includes devices that may have generally different constructs and capabilities, and thus the computing device 102 may be configured according to one or more of the different device classes. For instance, the computing device 102 may be implemented as the computer 202 class of a device that includes a personal computer, desktop computer, a multi-screen computer, laptop computer, netbook, and so on.

The computing device 102 may also be implemented as the mobile 202 class of device that includes mobile devices, such as a mobile phone, portable music player, portable gaming device, a tablet computer, a multi-screen computer, and so on. The computing device 102 may also be implemented as the television 206 class of device that includes devices having or connected to generally larger screens in casual viewing environments. These devices include televisions, set-top boxes, gaming consoles, and so on. The ink rendering techniques described herein may be supported by these various configurations of the client device 102 and are not limited to the specific examples of ink rendering techniques described herein.

The cloud 208 includes and/or is representative of a platform 210 for content services 212. The platform 210 abstracts underlying functionality of hardware (e.g., servers) and software resources of the cloud 208. The content services 212 may include applications and/or data that can be utilized while computer processing is executed on servers that are remote from the client device 102. Content services 212 can be provided as a service over the Internet and/or through a subscriber network, such as a cellular or Wi-fi network.

The platform 210 may abstract resources and functions to connect the computing device 102 with other computing devices. The platform 210 may also serve to abstract scaling of resources to provide a corresponding level of scale to encountered demand for the content services 212 that are implemented via the platform 210. Accordingly, in an interconnected device embodiment, implementation of functionality of the ink rendering module 112 may be distributed throughout the system 200. For example, the ink rendering module 112 may be implemented in part on the computing device 102 as well as via the platform 210 that abstracts the functionality of the cloud 208.

Generally, any of the functions described herein can be implemented using software, firmware, hardware (e.g., fixed logic circuitry), or a combination of these implementations. The terms "module," "functionality," and "logic" as used herein generally represent software, firmware, hardware, or a combination thereof. In the case of a software implementation, the module, functionality, or logic represents program code that performs specified tasks when executed on a processor (e.g., CPU or CPUs). The program code can be stored in one or more computer readable memory devices. The features of the ink rendering techniques described below are platform-independent, meaning that the techniques may be implemented on a variety of commercial computing platforms having a variety of processors.

Ink Rendering Implementation Examples

A variety of ink rendering techniques is described. In implementations, the ink rendering techniques are provided that may produce realistic looking ink, but still allow for ink analysis to run based on geometric representation of the ink stroke, such as through vector rendering by building the ink stroke using a strip of triangles. These techniques may be used to emulate paper, pen, and drawing characteristics (e.g., pressure and speed) through the use of pixel shaders and textures, which may then be applied to ink strokes for rendering. In this way, realistic ink rendering effects may be utilized while still supporting ink analysis, e.g., for search and indexing. Although the following discussion is separated for the sake of organization, it should be readily apparent that these techniques may be combined and/or further divided without departing from the spirit and scope thereof.

Geometric Representation of Ink Strokes

Figure 3:
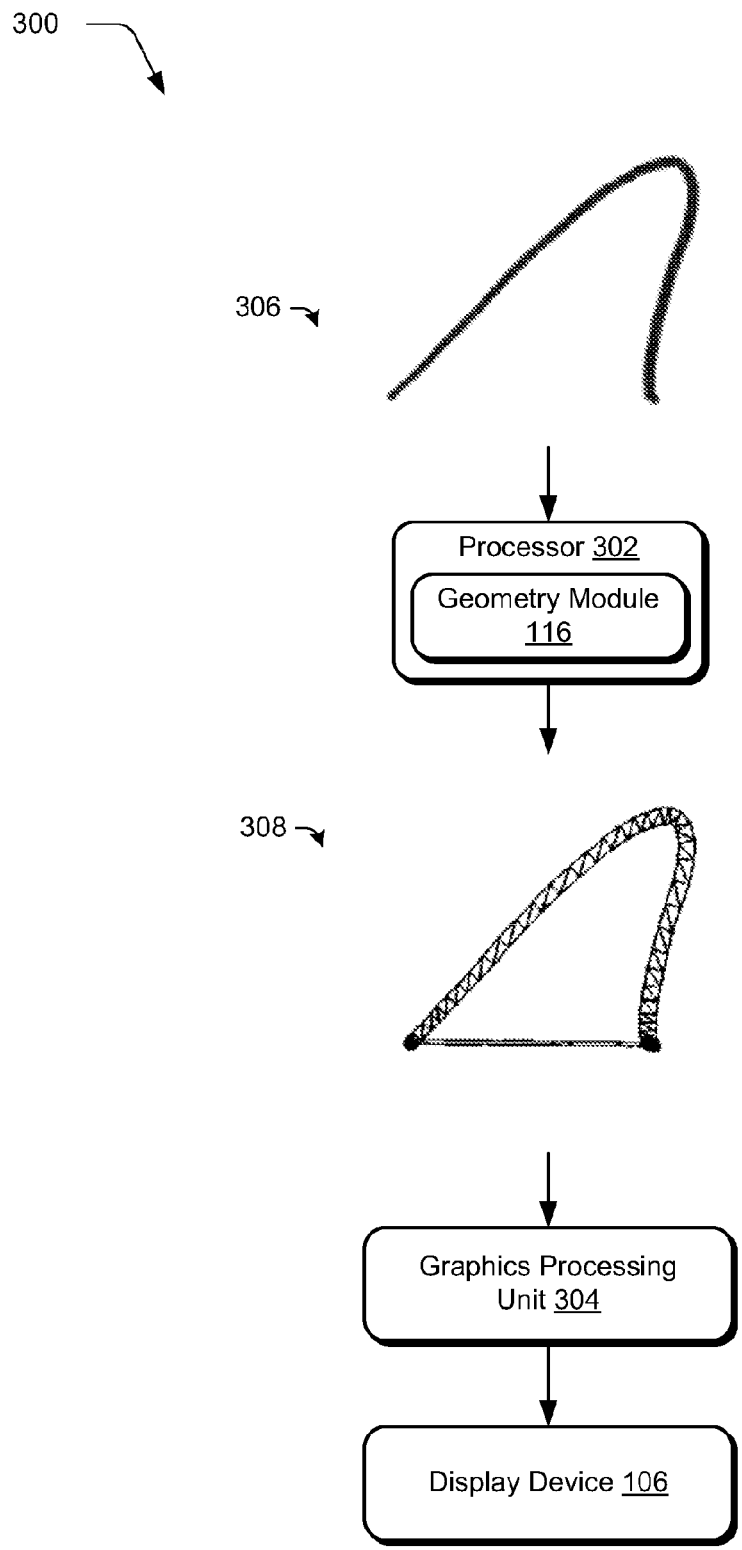
FIG. 3 is an illustration of a system in an example implementation of a geometry module of an input/output module of FIG. 1 in which an ink stroke is built from a geometry.

FIG. 3 depicts a system 300 in an example implementation of the geometry module 116 of the input/output module 112 of FIG. 1 in which an ink stroke is built from a geometry. In this example, functionality of the ink rendering module 112 is implemented using a processor 302 and a graphics processing unit 304 of the computing device 102 of FIG. 1. The geometry module 116 is illustrated as one or more executable modules that are executed by the processor 302, which may be implemented as a general purpose processor of the computing device 102. For example, the general purpose processor may execute an operating system that abstracts functionality of the computing device 102 for use by the geometry module 116.

The processor 302 is not limited by the materials from which it is formed or the processing mechanisms employed therein. For example, processor 302 may be representative of one or more processors composed of one or more cores. Further, the processor 302 may be comprised of semiconductor(s) and/or transistors (e.g., electronic integrated circuits (ICs)). In such a context, processor-executable instructions may be electronically-executable instructions. Alternatively, the mechanisms of or for processors, and thus of or for a computing device, may include, but are not limited to, quantum computing, optical computing, mechanical computing (e.g., using nanotechnology), and so forth. Additionally, although the geometry module 116 is illustrated as being executed on the processor 302, the geometry module 116 may be maintained in a computer-readable medium, e.g., a storage medium such as random access memory (RAM), hard disk memory, removable medium memory, and other types of computer-readable media.

The geometry module 116 is illustrated as receiving an input that describes an ink stroke. The input may be received in a variety of ways, such as detection of a finger of the user's hand 108 or stylus 110 using touchscreen functionality of the computing device 102, via a camera in a natural user interface, and so on. The geometry module 116 is then illustrated as representing the ink stroke 306 using vectors.

In this example, the ink stroke 306 is built as a strip of triangles 308. To build the strip of triangles 308, two vertices are added which are spaced apart by a width of the ink stroke and tangential to a direction of the stroke. These vertices may then be attached to a previous or subsequent vertex in a previous or subsequent tangential line to form the triangles. Addition functionality may also be employed to represent the ink stork 306, such as through the use of stamps as described in greater detail in relation to FIG. 5.

The strip of triangles 308 may then be passed to a graphics processing unit 304 for rendering by the display device 106. In an implementation, the strip of triangles 308 is passed via a single call to the graphics processing unit 304, thereby conserving resources of the computing device 102. Textures and/or pixels shaders may also be employed to emulate paper, pen, and other drawings characteristics, examples of which may be found in the following sections. In this way, ink analysis techniques (e.g., search and indexing) may still be applied to the ink stroke 306 using the strip of triangles 308 and yet provide a realistic representation of the ink stroke. Further, the representation of the ink stroke 306 (e.g., the strip of triangles 308) may be combined with representations of other ink strokes to further optimize performance of the computing device 102, an example of which may be found in relation to the following figure.

Figure 4:
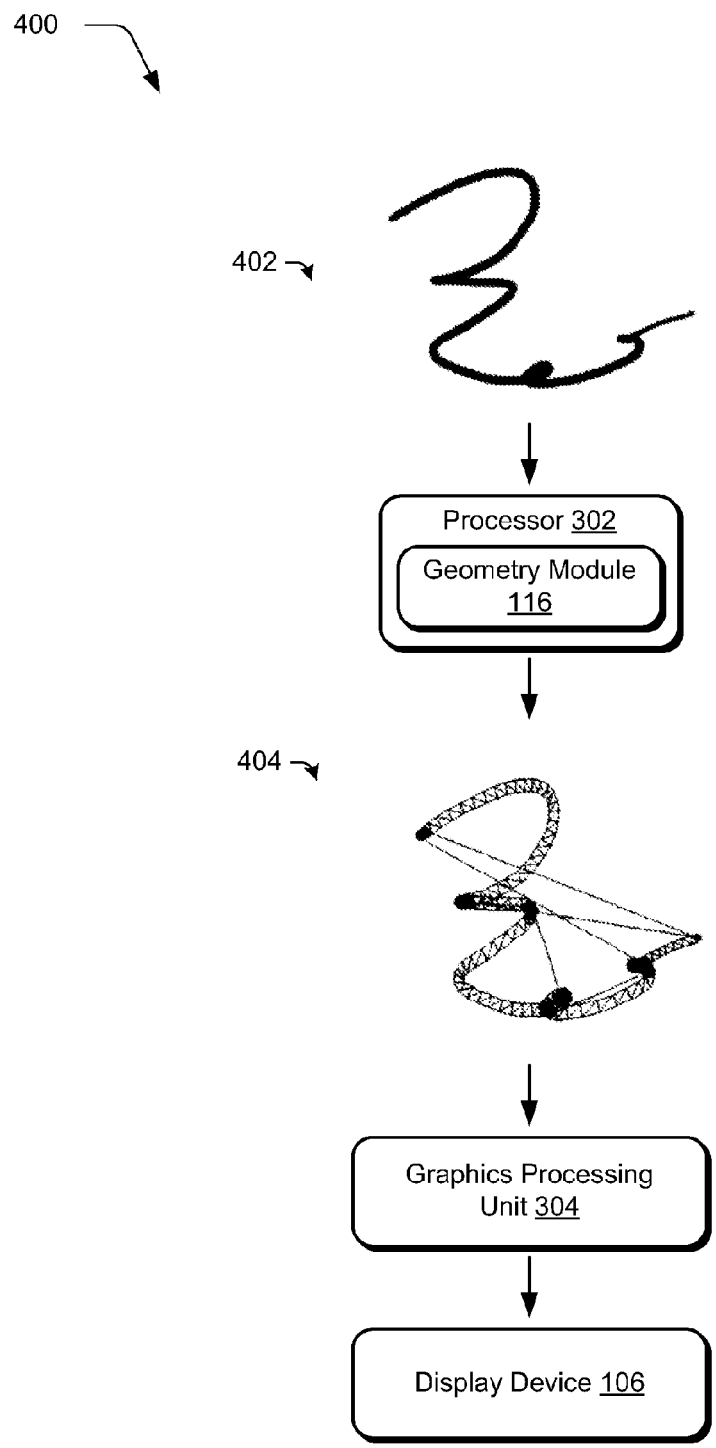
FIG. 4 illustrates a system in an example implementation of a geometry module of an input/output module of FIG. 1 in which ink strokes built from respective geometries are stitched together.

FIG. 4 depicts a system 400 in an example implementation of the geometry module 116 of the input/output module 112 of FIG. 1 in which ink strokes built from respective geometries are stitched together. Ink strokes 402 in this example are combined together into an even larger triangle strip. In this way, strokes 402 may be combined to make a single "draw" call to draw a large number of strokes at once by the graphics processing unit 304.

To do this, a stitching technique may be utilized. As shown in the strips of triangles 404, degenerate triangles may be introduced into the strip. The triangles may be introduced to provide a variety of functionality, such as to combine geometry that does not share a common vertex.

In the illustrated example, the strips of triangles 404 involve stitching that takes place to connect the circular stamps at specific points along the stroke. The circular stamps are used to represent portions of the ink stroke 402 that exhibit a bend that is greater than a threshold amount. In this way, the bend may be represented by a simplified geometry at those instances over a multitude of triangles that would otherwise be used to represent the ink stroke 402.

The stitches are illustrated using straight lines in the strip of triangles 404 in FIG. 4 that connect the geometry together in the illustrated example. In implementations, the stitches are not rendered but rather are utilized to provide a relationship that supports the single draw call to the graphics processing unit 304 as previously described. Further discussion of stitching may be found in relation to the following procedure.

Figure 5:
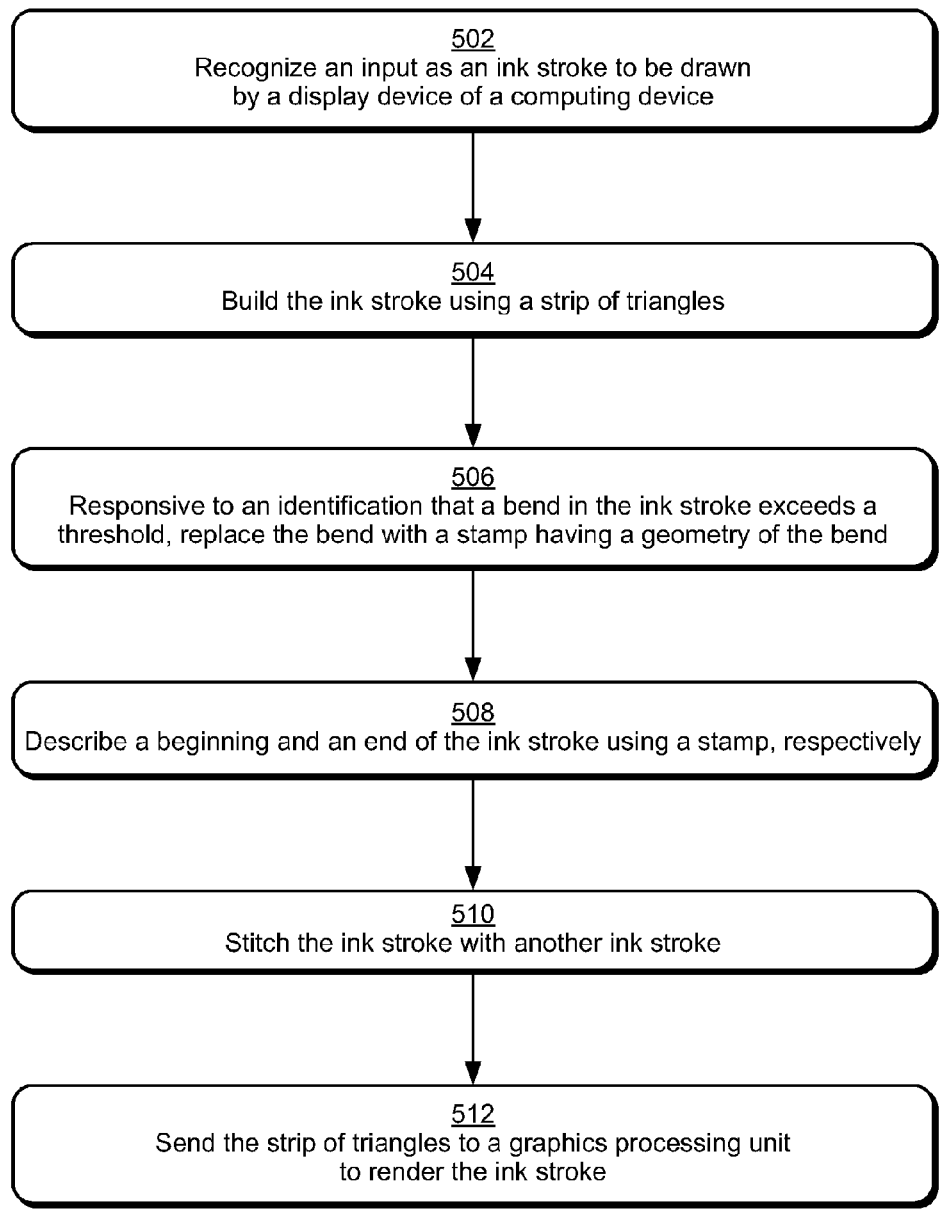
FIG. 5 is a flow diagram depicting a procedure in an example implementation in which ink rendering techniques involving geometry of an ink stroke are described.

FIG. 5 depicts a procedure in an example implementation in which ink rendering techniques involving geometry of an ink stroke are described. The following discussion describes ink rendering techniques that may be implemented utilizing the previously described systems and devices. Aspects of each of the procedures may be implemented in hardware, firmware, software, or a combination thereof. The procedures are shown as a set of blocks that specify operations performed by one or more devices and are not necessarily limited to the orders shown for performing the operations by the respective blocks. In portions of the following discussion, reference will be made to the environment 100 of FIG. 1 and the systems 300, 400 of FIGS. 3 and 4, respectively.

An input is recognized as an ink stroke to be drawn by a display device of a computing device (block 502). For example, touchscreen functionality of the computing device 102 may be used to detect a finger of a user's hand 108, a stylus 110, and so on. In another example, the input may be recognized as a gesture input through interaction with a natural user interface. A variety of other examples are also contemplated.

The ink stroke is built using a strip of triangles (block 504). The geometry module 116, for instance, may position vertices of the triangles that are spaced apart by a width of the ink stroke and are at a tangent to a direct of the ink stroke at points in the ink stroke. In some instances, however, representation of the ink stroke in this manner may result in use of resources that is greater than if done using other representations. Accordingly, other representations may also be employed to represent the ink stroke.

For example, responsive to an identification that a bend in the ink stroke exceeds a threshold, the bend may be replaced with a stamp having a geometry of the bend (block 506). In this way, a single geometric representation may be utilized in such an instance.

Likewise, a beginning and an end of the ink stroke may be described using a stamp, respectively (block 508). As shown in FIG. 3, for instance, the beginning and end of the ink stroke 306 may be represented using a rounded geometry to provide a realistic look to the ink stroke that otherwise would be represented using a multitude of triangles. It should be readily apparent, however, that other implementations are also contemplated, such as to represent the beginning, end, and/or bends of the ink stroke using triangles as described previously.

Further the ink stroke may be stitched with another ink stroke (block 510). As described in relation to FIG. 4, the stitching may be utilized to combine strips of triangles for use in a single draw call to the graphics processing unit 304 thus conserving resources and increasing efficiency of the computing device 102.

The strip of triangles is then sent to the graphics processing unit to render the ink stroke (block 512). In this way, the geometry of the ink stroke may be described in a manner that supports ink analysis. Further, the geometry may also support techniques that may be utilized to provide a realistic appearance of the ink stroke, e.g., textures and functionality of a pixel shader. Examples of display characteristics that may be supported using the geometry may be found in relation to the following section.

Pressure and Speed Techniques for Rendering Ink

Figure 6:
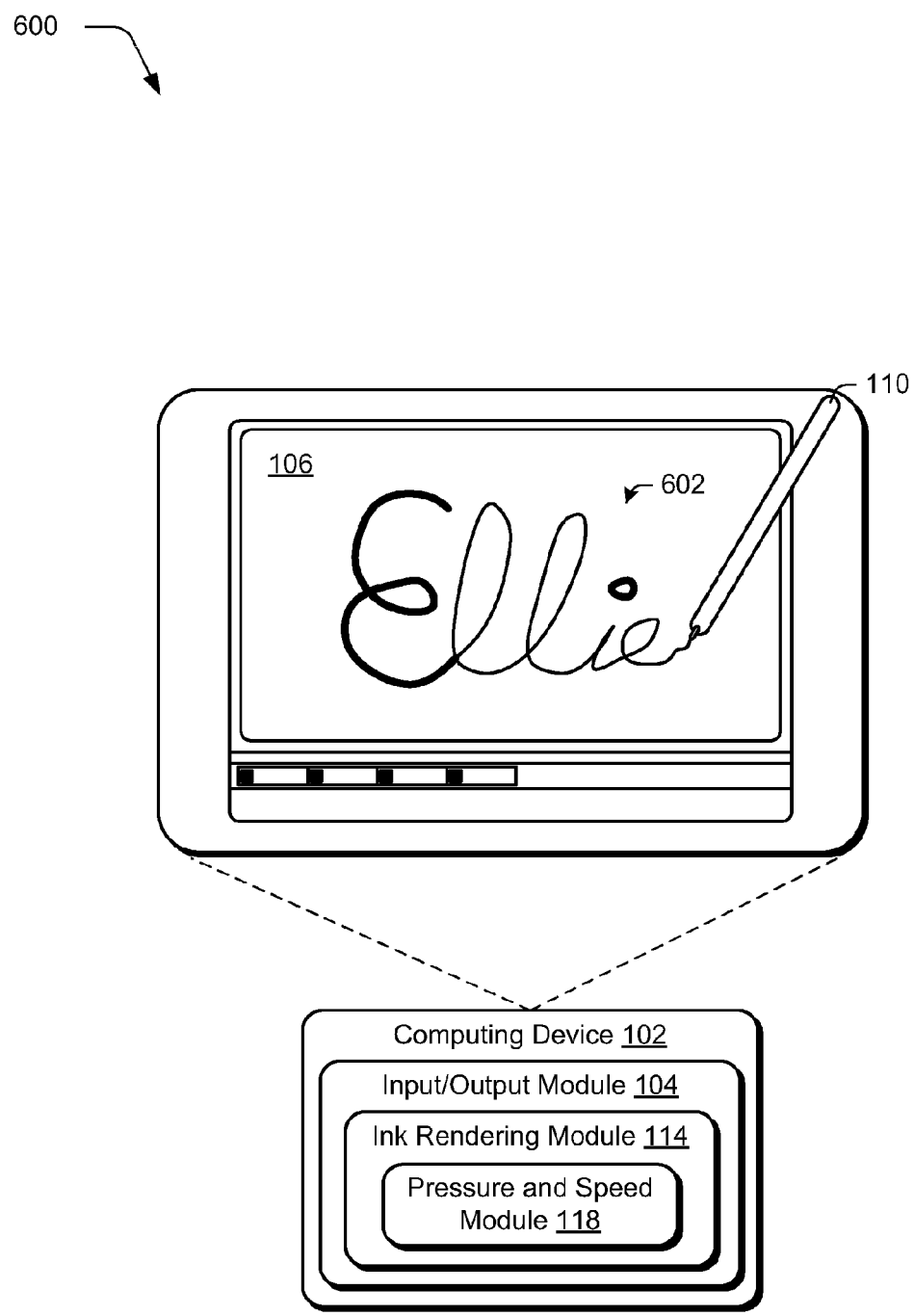
FIG. 6 illustrates a system in an example implementation of a pressure and speed module of the input/output module of FIG. 1 in which pressure and speed are utilized to adjust display characteristics of an ink stroke.

FIG. 6 depicts a system 600 in an example implementation of the pressure and speed module 118 of the input/output module 112 of FIG. 1 in which pressure and speed are utilized to adjust display characteristics of an ink stroke. A variety of other factors may be used regarding display characteristics of a line 602 beyond just the actual line that is to be drawn, which in the illustrated instance is a freeform line drawn using a stylus 110.

For example, when drawing a line using traditional pen and paper, characteristics such as a speed and pressure may affect how the line is drawn, such as a width of the line, opacity of the line, absorption of ink of the line by the paper, and so on. Accordingly, the pressure and speed module 118 may be configured to adjust display characteristics of the line 602 based on the pressure and speed to mimic a "look and feel" of pen on paper, further discussion of which may be found in relation to the following figure.

Figure 7:
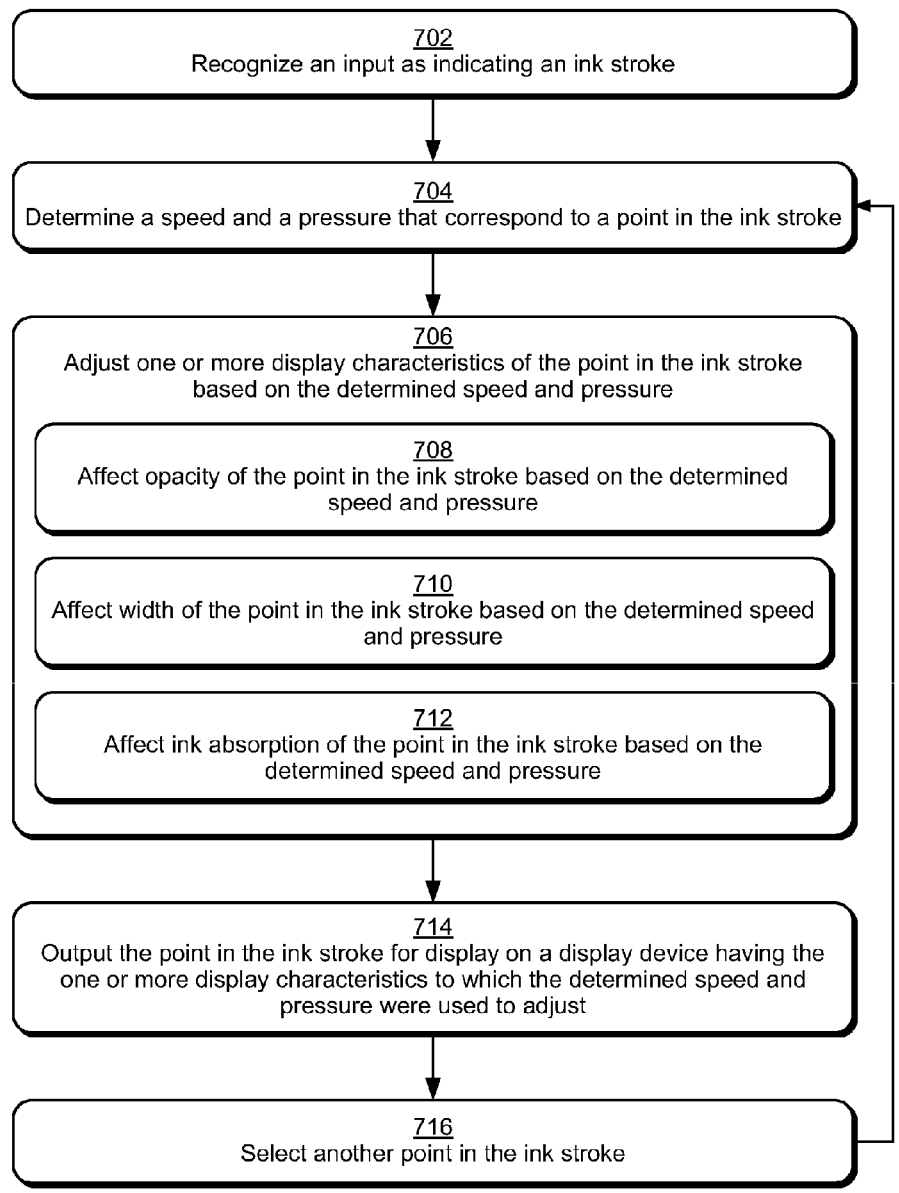
FIG. 7 is a flow diagram depicting a procedure in an example implementation in which ink rendering techniques involving pressure and speed of an ink stroke are described.

FIG. 7 is a flow diagram depicting a procedure in an example implementation in which ink rendering techniques involving pressure and speed of an ink stroke are described. The following discussion describes ink rendering techniques that may be implemented utilizing the previously described systems and devices. Aspects of each of the procedures may be implemented in hardware, firmware, software, or a combination thereof. The procedures are shown as a set of blocks that specify operations performed by one or more devices and are not necessarily limited to the orders shown for performing the operations by the respective blocks. In portions of the following discussion, reference will be made to the environment 100 of FIG. 1 and the system 600 of FIG. 6.

An input is recognized as indicating an ink stroke (block 702). As previously described, touchscreen functionality, NUI functionality, and so on may be utilized to detect an input that indicates that an ink stroke is to be rendered by the computing device 102.

Speed and pressure that correspond to a point in the ink stroke are determined (block 704). For example, the computing device 102 may detect the speed based on how fast a finger of the user's hand 108, a stylus 110, and so on is moved across the display device 106 using touchscreen functionality. Other examples are also contemplated, such as to determine speed in a natural user interface (NUI).

Likewise, an amount of pressure may also be determined in a variety of ways, such as pressure sensors disposed beneath the display device 106, a strain gauge, detecting a change in surface area of a source of the input (e.g., from pressing a finger of the user's hand 108 harder and softer against the display device), from a peripheral (e.g., a pressure sensor of the stylus 110), and so on.

One or more display characteristics are adjusted of the point in the ink stroke based on the determined speed and pressure (block 706). For example, the display characteristics may be adjusted to mimic an effect of speed and pressure on ink written by traditional pen and paper.

The determined speed and pressure, for instance, may affect opacity of the point in the ink stroke based on the determined speed and pressure (block 708). Thus, in this example as the speed increases the opacity may decrease to mimic a lesser amount of ink being deposited on the paper. However, as the pressure increases so to may the opacity to mimic an increase in an amount of ink being applied to the paper. Thus, these factors may have a different effect on the ink that is to be rendered by the computing device 102.

The opacity of a point in an ink stroke, for instance, may be defined using the following expression:

$$O' = O * f(P) * f(S)$$

where "O'" is the computed opacity for a point, "O" is a maximum opacity of the ink stroke, "P," is a pressure at the point, and "S" is a speed at the point. In an implementation, function "f" may be used to attenuate pressure and/or speed.

For example, the following attenuation expression may be employed as function "f" in the above expression:

$$f(x) = \min(1, \max(0, a0 + (x*a1) + (x*x*a2) + (x*x*x*a3)))$$

in which x represents a value for pressure or speed to be attenuated, a0 represents constant attenuation, a1 represents linear attenuation, a2 represents squared attenuation, and a3 represents cubed attenuation.

Likewise, the width of the point in the ink stroke may be affected based on the determined speed and pressured (block 710). In this example, as the speed increases the width of the ink stroke may decrease to mimic a lesser amount of ink being deposited on the paper. However, as the pressure increases the width of the ink stroke may be increased to mimic an increase in an amount of ink being applied to the paper.

As above, the width of a point in an ink stroke may be defined using the following expression:

$$W' = W * f(P) * f(S)$$

in which "W'" is the computed opacity for a point, "W" is a maximum width of the ink stroke, "P," is a pressure at the point, and "S" is a speed at the point.

Additionally, function "f" may also be used to attenuate pressure and/or speed on the display characteristic, which is width in this example. As in the previous example for opacity, the following attenuation expression may be employed as the function "f" in the above expression:

$$f(x) = \min(1, \max(0, a0 + (x*a1) + (x*x*a2) + (x*x*x*a3)))$$

in which x represents a value for pressure or speed to be attenuated, a0 represents constant attenuation, a1 represents linear attenuation, a2 represents squared attenuation, and a3 represents cubed attenuation.

Ink absorption of the point in the ink stroke may also be affected based on the determined speed and pressure (block 712), such as to mimic different and/or changing absorbencies of a medium that is being written upon, e.g., paper and the grains that makes up the paper.

The absorption value (e.g., "A'") of a point in an ink stroke may be defined using the following expression:

$$A' = f(P) * f(S)$$

in which "P," is a pressure at the point and "S" is a speed at the point. Function "f" as described above may also be used to attenuate pressure and/or speed on the display characteristic.

In this example, the absorption value may be passed to a pixel shader of the graphics processing unit to affect a final alpha value of a point in the ink stroke to be rendered. Additionally, this effect may be applied after an alpha value is computed for other purposes, such as anti-aliasing as further described in the corresponding section below. For example, a final alpha value may be computed by the graphics processing unit using the following expression:

$$final\_alpha = alpha * \min(1, absorption/grain),$$

where alpha is an alpha value for anti-aliasing effect at given pixel, absorption is equal to an absorption value for ink at given pixel, and grain is equal to a paper grain value, which may be represented as a height map and sampled as a two dimensional texture. A variety of other display characteristics are also contemplated without departing from the spirit and scope thereof.

The point in the ink stroke is output for display on a display device having the one or more display characteristics to which the determined speed and pressure were used to adjust (block 712). Another point in the ink stroke is selected (block 716), if available and the process is repeated. Continuing with the previous example, the point may be output by the graphics processing unit 304 for display by the display device with other points to render the ink stroke.

Anti-Aliasing Techniques for Rendering Ink

Figure 8:
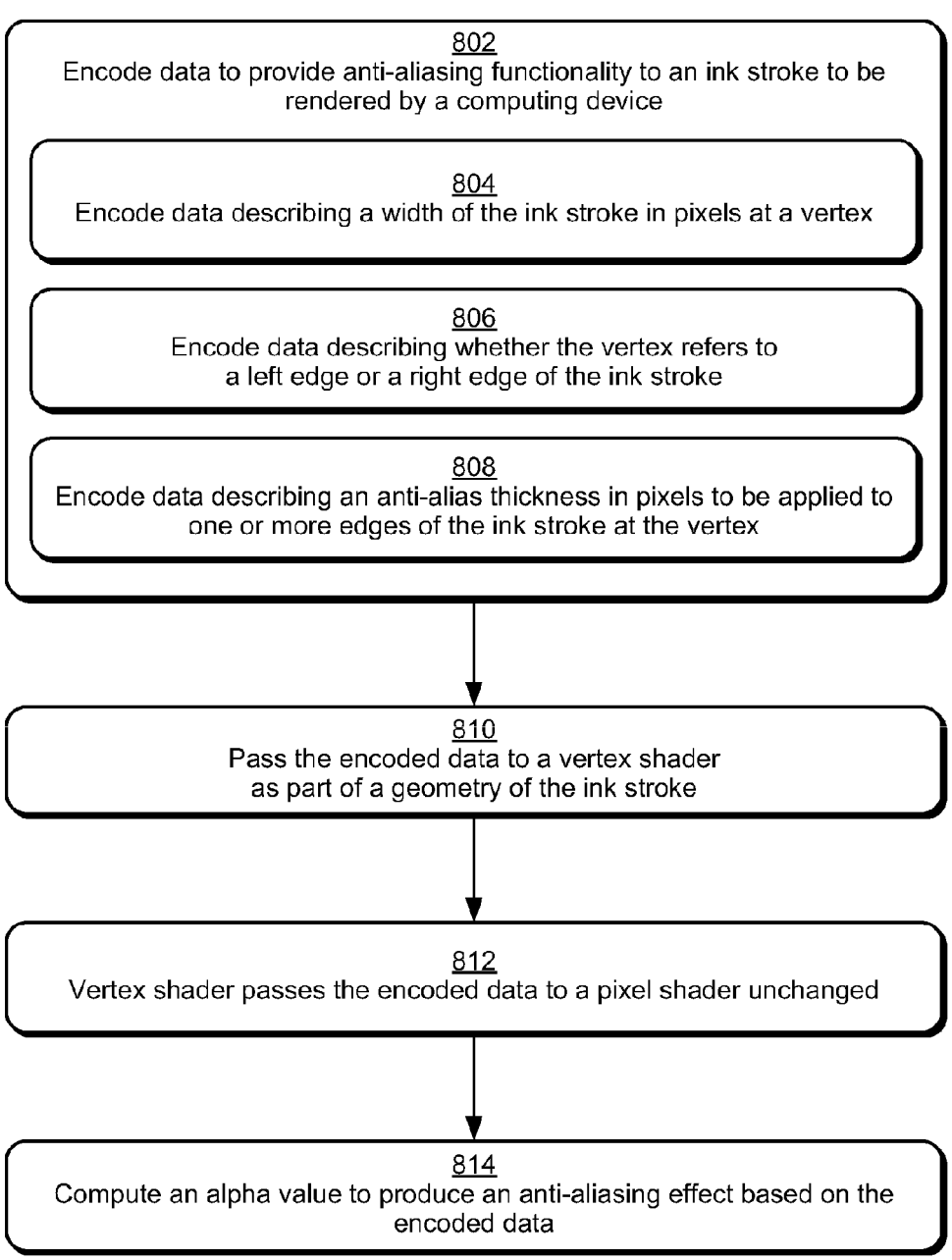
FIG. 8 depicts a system in an example implementation of an anti-aliasing module of the input/output module of FIG. 1 in which encoding techniques are employed to provide anti-aliasing functionality to an ink stroke.

FIG. 8 depicts a system 800 in an example implementation of the anti-aliasing module 120 of the input/output module 112 of FIG. 1 in which encoding techniques are employed to provide anti-aliasing functionality to an ink stroke. Anti-aliasing techniques are generally employed to smooth jagged edges of lines. In this example, the anti-aliasing techniques involve encoding extra data into vertices of the ink stroke, which may be performed as follows.

Data is encoded to provide anti-aliasing functionality to an ink stroke to be rendered by a computing device (block 802). For example, a value "AA" may be a float vector that is defined to store anti-alias data at each vertex in the stroke. Data may be encoded that describes a width of the ink stroke in pixels at a vertex (block 804), which may be represented as "AA.x."

Data may also be encoded that describes whether the vertex refers to a left edge or a right edge of the ink stroke (block 806). For example, a value "AA.y" may be set to "0.0" if the vertex represents a left edge of the ink stroke or set to "1.0" if the vertex references a right edge of the ink stroke.

Data may also be encoded that describes an anti-alias thickness in pixels to be applied to one or more edges of the ink stroke at the vertex (block 808). For example, a value "AA.z" may describe a number of pixels to be applied to each edge of the ink stroke. A variety of other data may be encoded to vertices to be leveraged by anti-aliasing techniques.

The encoded data is passed to a vertex shader as part of a geometry of the ink stroke (block 810). As described in relation to FIGS. 3-5, the geometry of an ink stroke may be represented using a strip of triangles and stamps to enable ink analysis techniques to be employed as well as rich display techniques using textures and pixel shaders. This geometry may be passed to the vertex shader along with the encoded data for rendering by the graphics processing unit, which may include employing anti-aliasing techniques using the encoded data.

The vertex shader may then pass the encoded data to a pixel shader unchanged (block 812). An alpha value may then be computed to produce an anti-Microsoft aliasing effect based on the encoded data (block 814). For example, the pixel shader may employ logic represented in the following pseudo code:

```
//determine anti-aliasing alpha values for left and right edges of stroke
float p = pixel.uv0.x * pixel.uv0.y;
float alpha1 = p * pixel.uv0.z;
float alpha2 = (pixel.uv0.x – p) * pixel.uv0.z;
//alpha value of fragment for correct anti-aliasing effect
float alpha = pixel.color0.w * min(1,min(alpha1, alpha2));
```

Thus, alpha values may be computed by the pixel shader to provide anti-aliasing functionality. Additionally, these alpha values may be computed in conjunction with absorption values described in the previous section to arrive at a final alpha value per pixel.

Masking Techniques for Rendering Ink

Figure 9:
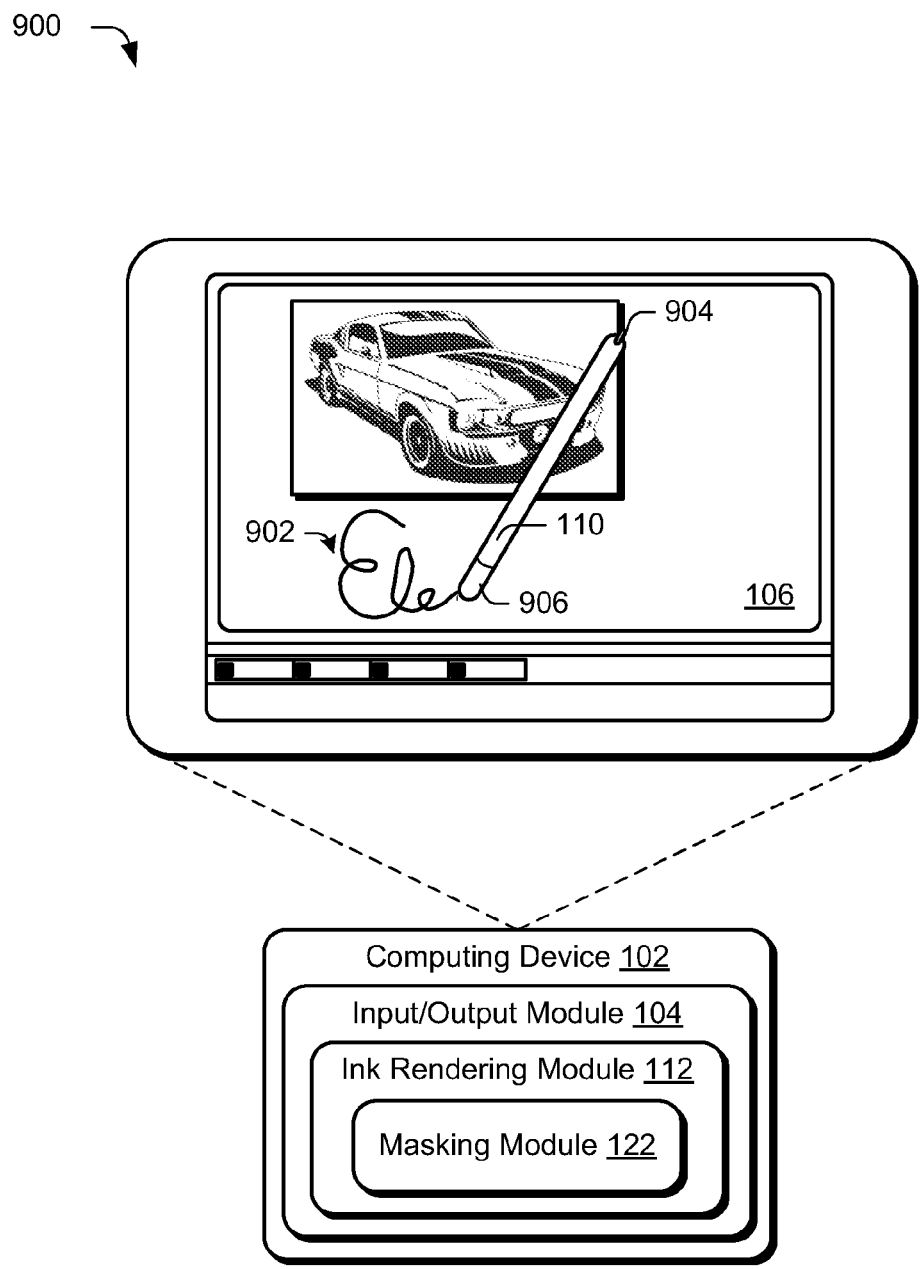
FIG. 9 depicts a system in an example implementation in which a masking module is implemented to erase part of an ink stroke.

FIG. 9 depicts a system 900 in an example implementation in which a masking module 122 is implemented to erase part of an ink stroke. In this example, the computing device 102 is illustrated as displaying an ink stroke 902 on the display device 106. The computing device 102 is also illustrated as employing functionality to erase part of the ink stroke 902.

For example, the input/output module 104 may be configured to differentiate between first and second ends 904, 906 of a stylus. The first end 904 of the stylus 110 may be configured through interaction with the computing device 102 to provide writing inputs, such as to draw the ink stroke 902. The second end 906 of the stylus 110 may be configured through interaction with the computing device 102 to perform erase operations. Detection of the erase operation may then cause the masking module 122 to employ masking ink techniques to "erase" a corresponding portion of the ink stroke 902, further discussion of which may be found in relation to the following figure.

Figure 10:
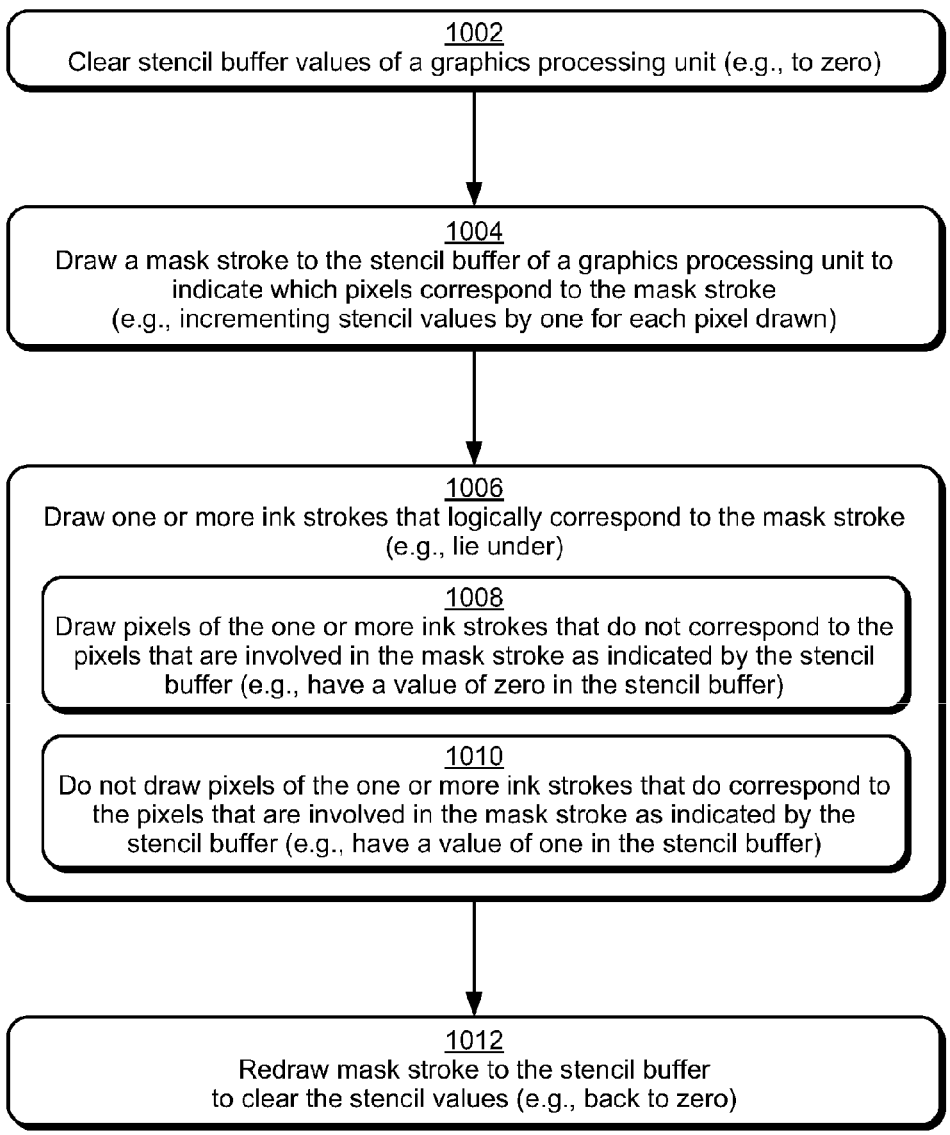
FIG. 10 is a flow diagram depicting a procedure in an example implementation in which masking stroke techniques are employed to erase a portion of an ink stroke.

FIG. 10 depicts a procedure 1000 in an example implementation in which masking stroke techniques are employed to erase a portion of an ink stroke. Stencil buffer values of a graphics processing unit are cleared (block 1002), e.g., set to zero. For example, the masking module 122 may communicate with the stencil buffer of the graphics processing unit to set the values.

A mask stroke is drawn to the stencil buffer of the graphics processing unit to indicate which pixels correspond to the mask stroke (block 1004). Continuing with the previous example, the mask stroke may be drawn to the stencil buffer to indicate which pixels correspond to the mask stroke and therefore the erase operation. In this example, the stencil buffer values are incremented by one for each pixel drawn for the mask stroke.

One or more ink strokes are then drawn that logically correspond to the mask stroke (block 1006), e.g., has at least a portion of the ink stroke that "lies under" mask stroke. In this example, pixels of the one or more ink strokes are drawn that do not correspond to the pixels that are involved in the mask stroke as indicated by the stencil buffer (block 1008), e.g., has a value of zero in the stencil buffer. Pixels are not drawn of the one or more ink strokes that do correspond to the pixels that are involved in the mask stroke as indicated by the stencil buffer (block 1010), e.g., have a value of one in the stencil buffer. In this way, "unmasked" portions of the ink stroke 902 are rendered and masked portions are not, thereby giving an effect of erasing portions of the ink stroke.

The mask stroke may then be redrawn to the stencil buffer in this example to clear the stencil values (block 1012), e.g., back to zero. Thus, the procedure 1000 may then be repeated for a new mask stroke. Although the mask stroke was described as being input using a particular end of a stylus, it should be readily apparent that the mask stroke may be specified in a variety of ways, such as by using a finger of a user's hand 108, a cursor control device, in a natural user interface (NUI), and so on.

Highlighter Techniques for Rendering Ink

Figure 11:
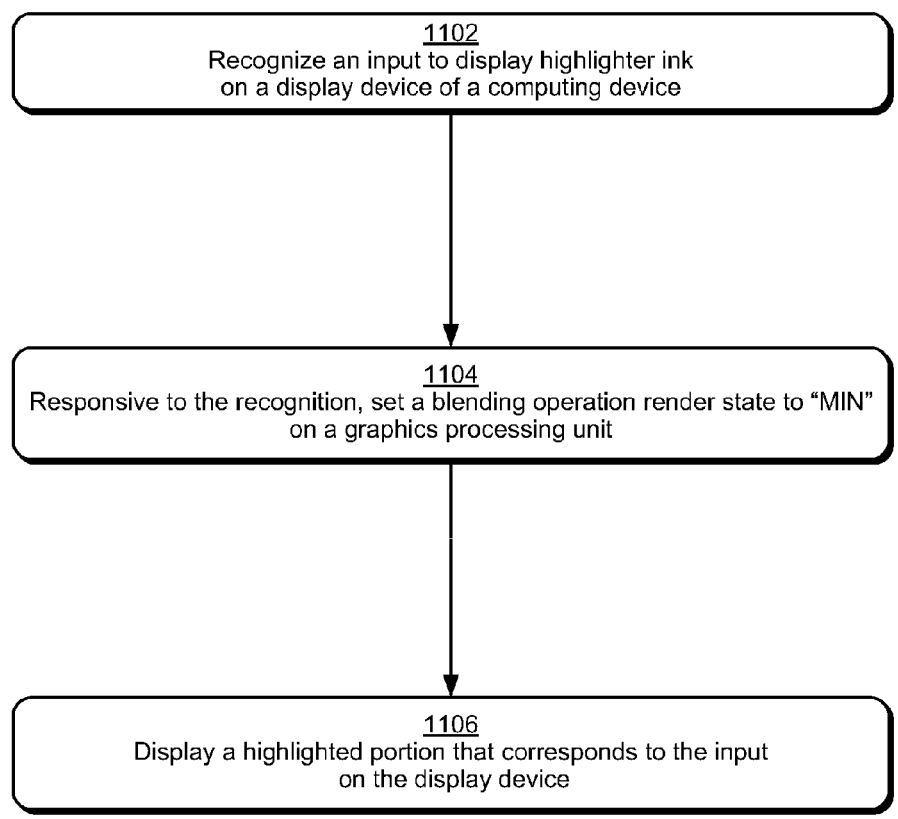
FIG. 11 depicts a procedure in an example implementation in which a highlighter module of FIG. 1 is implemented to highlight an ink stroke.

FIG. 11 depicts a procedure 1100 in an example implementation in which a highlighter module 124 is implemented to highlight an ink stroke. For this implementation of highlighter ink, MIN blending on a graphics processing unit (GPU) is used to produce more accurate highlighter ink than other common approaches. MIN blending is setup on the GPU by setting the "blending operation" render state to "MIN" as shown in the following example.

An input is recognized to display highlighter ink on a display device of a computing device (block 1102). For example, a finger of a user's hand 108, a stylus 110, a gesture in a natural user interface (NUI), a cursor control device, and so on may provide an input (e.g., through selection in a menu, icon, and so on) to highlight a portion of a display. A variety of different portions may be highlighted, such as text, images, drawings, and so on.

Responsive to the recognition, the highlighter module 124 sets a blending operation render state to "MIN" on a graphics processing unit (block 1104). For example, the highlighter module 124 may identify a portion that is to be highlighted and set the blending operation render state to "MIN" to perform the highlighting. Therefore, a portion to be highlighted may be blended with ink used by the highlighter to arrive at a final output for display. A highlighted portion is displayed that corresponds to the input on the display device (block 1106).

Example Device

Figure 12:
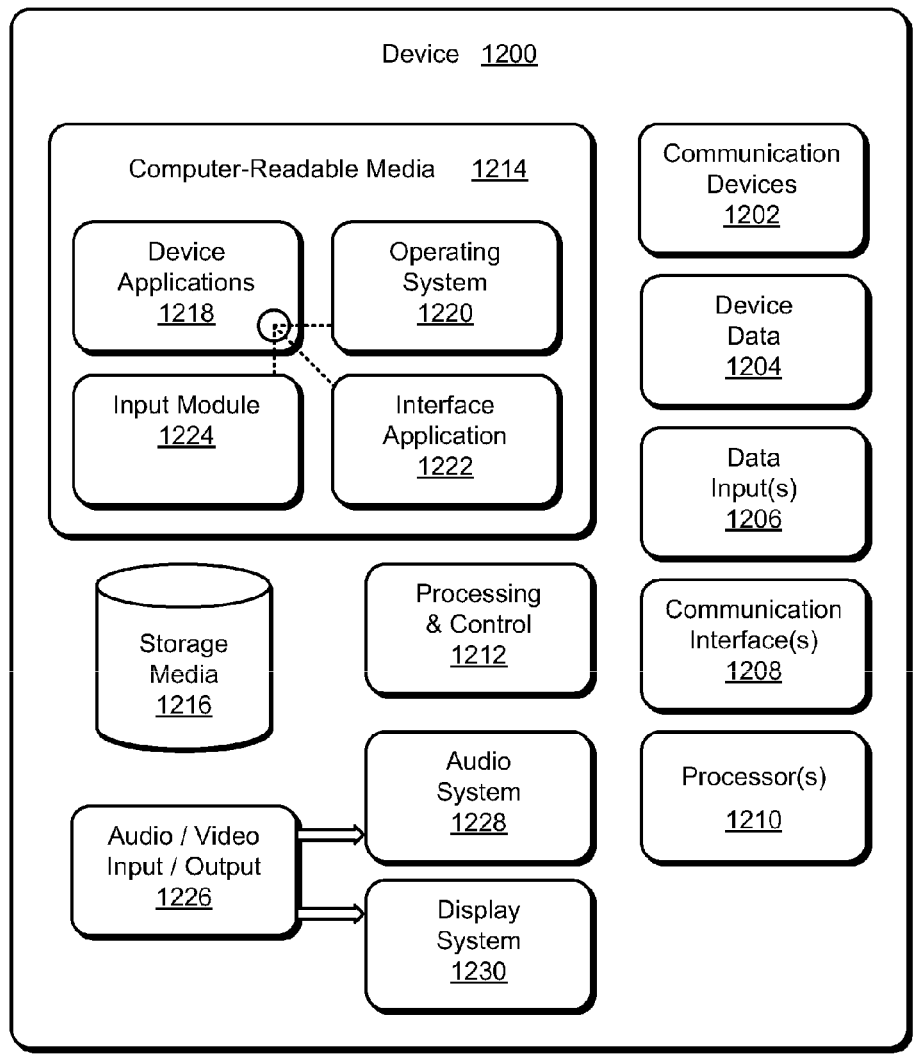
FIG. 12 illustrates various components of an example device that can be implemented as any type of portable and/or computer device as described with reference to FIGS. 1-2 to implement embodiments of the ink rendering techniques described herein.

FIG. 12 illustrates various components of an example device 1200 that can be implemented as any type of portable and/or computer device as described with reference to FIGS. 1 and 2 to implement embodiments of the gesture techniques described herein. Device 1200 includes communication devices 1202 that enable wired and/or wireless communication of device data 1204 (e.g., received data, data that is being received, data scheduled for broadcast, data packets of the data, etc.). The device data 1204 or other device content can include configuration settings of the device, media content stored on the device, and/or information associated with a user of the device. Media content stored on device 1200 can include any type of audio, video, and/or image data. Device 1200 includes one or more data inputs 1206 via which any type of data, media content, and/or inputs can be received, such as user-selectable inputs, messages, music, television media content, recorded video content, and any other type of audio, video, and/or image data received from any content and/or data source.

Device 1200 also includes communication interfaces 1208 that can be implemented as any one or more of a serial and/or parallel interface, a wireless interface, any type of network interface, a modem, and as any other type of communication interface. The communication interfaces 1208 provide a connection and/or communication links between device 1200 and a communication network by which other electronic, computing, and communication devices communicate data with device 1200.

Device 1200 includes one or more processors 1210 (e.g., any of microprocessors, controllers, and the like) which process various computer-executable instructions to control the operation of device 1200 and to implement embodiments of a touch pull-in gesture. Alternatively or in addition, device 1200 can be implemented with any one or combination of hardware, firmware, or fixed logic circuitry that is implemented in connection with processing and control circuits which are generally identified at 1212. Although not shown, device 1200 can include a system bus or data transfer system that couples the various components within the device. A system bus can include any one or combination of different bus structures, such as a memory bus or memory controller, a peripheral bus, a universal serial bus, and/or a processor or local bus that utilizes any of a variety of bus architectures.

Device 1200 also includes computer-readable media 1214, such as one or more memory components, examples of which include random access memory (RAM), non-volatile memory (e.g., any one or more of a read-only memory (ROM), flash memory, EPROM, EEPROM, etc.), and a disk storage device. A disk storage device may be implemented as any type of magnetic or optical storage device, such as a hard disk drive, a recordable and/or rewriteable compact disc (CD), any type of a digital versatile disc (DVD), and the like. Device 1200 can also include a mass storage media device 1216.

Computer-readable media 1214 provides data storage mechanisms to store the device data 1204, as well as various device applications 1218 and any other types of information and/or data related to operational aspects of device 1200. For example, an operating system 1220 can be maintained as a computer application with the computer-readable media 1214 and executed on processors 1210. The device applications 1218 can include a device manager (e.g., a control application, software application, signal processing and control module, code that is native to a particular device, a hardware abstraction layer for a particular device, etc.). The device applications 1218 also include any system components or modules to implement embodiments of the gesture techniques described herein. In this example, the device applications 1218 include an interface application 1222 and an input/output module 1224 (which may be the same or different as input module 114) that are shown as software modules and/or computer applications. The input/output module 1224 is representative of software that is used to provide an interface with a device configured to capture inputs, such as a touchscreen, track pad, camera, and so on. Alternatively or in addition, the interface application 1222 and the input/output module 1224 can be implemented as hardware, software, firmware, or any combination thereof. Additionally, the input/output module 1224 may be configured to support multiple input devices, such as separate devices to capture touch and stylus inputs, respectively. For example, the device may be configured to include dual display devices, in which one of the display device is configured to capture touch inputs while the other stylus inputs.

Device 1200 also includes an audio and/or video input-output system 1226 that provides audio data to an audio system 1228 and/or provides video data to a display system 1230. The audio system 1228 and/or the display system 1230 can include any devices that process, display, and/or otherwise render audio, video, and image data. Video signals and audio signals can be communicated from device 1200 to an audio device and/or to a display device via an RF (radio frequency) link, S-video link, composite video link, component video link, DVI (digital video interface), analog audio connection, or other similar communication link. In an embodiment, the audio system 1228 and/or the display system 1230 are implemented as external components to device 1200. Alternatively, the audio system 1228 and/or the display system 1230 are implemented as integrated components of example device 1200.

Conclusion

Although the invention has been described in language specific to structural features and/or methodological acts, it is to be understood that the invention defined in the appended claims is not necessarily limited to the specific features or acts described. Rather, the specific features and acts are disclosed as example forms of implementing the claimed invention.

What is claimed is:

1. A method comprising:
    recognizing an input by one or more modules executable on one or more processors of a computing device as an ink stroke to be rendered by a display device of the computing device;
    building the ink stroke by the one or more modules using a strip of triangles;
    identifying, with a geometry module, a bend in the ink stroke that exceeds a threshold change of direction in the ink stroke;
    replacing, with the geometry module and in response to the identifying, the bend in the ink stroke with a stamp having a geometry of the bend; and
    sending the strip of triangles and the stamp to a graphics processing unit to render the ink stroke.

2. A method as described in claim 1, further comprising replacing the triangles comprising a beginning and an end of the ink stroke using additional stamps, respectively; and
    sending the additional stamps to a graphics processing unit to render the ink stroke.

3. A method as described in claim 1, wherein the strip of triangles have vertices that are spaced apart by a width of the ink stroke and at a tangent to a direction of the ink stroke.

4. A method as described in claim 1, wherein the sending is performed as a single call to the graphics processing unit.

5. A method as described in claim 1, further comprising stitching the ink stroke with another ink stroke built using another strip of triangles and wherein the sending is performed as a single call to the graphics processing unit using the stitched ink strokes.

6. A method as described in claim 5, wherein the stitching includes introducing degenerate triangles in order to stitch the ink stroke together with the other ink stroke responsive to a determination that the ink stroke and the other ink stroke do not share a vertex.

7. A method comprising:
    recognizing an input by one or more modules executable on one or more processors of a computing device as an ink stroke to be rendered by a display device of the computing device;
    determining a speed and a pressure that correspond to a point in the ink stroke; and
    adjusting a display characteristic of the point in the ink stroke for rendering of the point based on the determined speed and pressure, utilizing constant attenuation, linear attenuation, squared attenuation, and cubed attenuation.

8. A method as described in claim 7, wherein the input is detected at least in part using touchscreen functionality of the computing device.

9. A method as described in claim 7, wherein the display characteristic is opacity.

10. A method as described in claim 7, wherein the display characteristic is width of the ink stroke.

11. A method as described in claim 7, wherein the display characteristic is ink absorption.

12. A method as described in claim 7, wherein an absorption value for point is computed for the point as follows:

$$\text{final\_alpha} = \text{alpha} * \min(1, \text{absorption}/\text{grain}),$$

where alpha is an alpha value for anti-aliasing effect at given pixel, absorption is equal to an absorption value for ink at a given pixel, and grain is equal to a paper grain value, represented as a height map and sampled as a two-dimensional texture.

13. A method as described in claim 7, wherein the adjusting is performed using an expression in which x represents a value for pressure or speed to be attenuated, a0 represents constant attenuation, a1 represents linear attenuation, a2 represents squared attenuation, and a3 represents cubed attenuation:

$$f(x)=\min(1,\max(0, a0+(x*a1)+(x*x*a2)+(x*x*x*a3))).$$

14. A method as described in claim 13, wherein the adjusting of the display characteristic is performed such that the adjusted display characteristic at the point in the ink stroke is equal to a maximum value of the display characteristic multiplied by the expression as applied to the pressure at the point multiplied by the expression as applied to the speed at the point.

15. A method comprising:
recognizing an input by one or more module executable on one or more processors of a computing device as an ink stroke to be rendered by a display device of the computing device;
encoding data of the input by encoding data describing a width of the ink stroke in pixels at a vertex;
encoding data describing whether the vertex is located along a left edge or a right edge of the ink stroke;
encoding data describing an anti-alias thickness in pixels to be applied to one or more said edges of the ink stroke at the vertex;
passing the encoded data to a vertex shader of a graphics processing unit;
passing the encoded data from the vertex shader to a pixel shader of the graphics processing unit, without changing the encoded data; and
computing, at the pixel shader, the alpha value as part of a geometry of the ink stroke to produce an anti-aliasing effect based at least in part on the encoded data.

16. A method as described in claim 15, wherein the alpha value is computed as follows:

$$p=\text{pixel}.uv0.x*\text{pixel}.uv0.y;$$

$$\text{alpha1}=p*\text{pixel}.uv0.z;$$

$$\text{alpha2}=(\text{pixel}.uv0.x-p)*\text{pixel}.uv0.z;$$

$$\text{alpha}=\text{pixel}.\text{color0}.w*\min(1,\min(\text{alpha1}, \text{alpha2}));$$

where pixel.uv0.x is a value for the width of the ink stroke in pixels at the vertex, pixel.uv0.y is a value representing whether the vertex is located along the right edge or the left edge, pixel.uv0.z is a value for the anti-alias thickness applied to said edges at the vertex, and alpha is an the determined alpha value for the anti-aliasing effect.

17. A method as described in claim 16, further comprising computing the alpha value for each pixel.

18. A method as described in claim 15, wherein the alpha value is computed based at least in part upon an absorption value.

19. A method as described in claim 15, further comprising computing the alpha value and an absorption value separately; and combining the alpha value and the absorption value to arrive at a final alpha value for each pixel.

* * * * *